United States Patent [19]
Blumenthal et al.

[11] 3,846,339
[45] Nov. 5, 1974

[54] CATALYST FOR THE SPONTANEOUS DECOMPOSITION OF MONOPROPELLANT HYDRAZINE

[75] Inventors: Jack L. Blumenthal, Los Angeles; Eugene D. Guth, Palos Verdes Estates, both of Calif.

[73] Assignee: TRW Inc., Redondo Beach, Calif.

[22] Filed: Apr. 13, 1970

[21] Appl. No.: 32,486

Related U.S. Application Data

[62] Division of Ser. No. 698,846, Jan. 18, 1968, Pat. No. 3,732,694.

[52] U.S. Cl.............. 252/438, 252/461, 252/465, 252/466 J, 252/466 PT, 252/467
[51] Int. Cl......................... B01j 11/08, B01j 11/22
[58] Field of Search...... 252/461, 466 PT, 467, 465, 252/466 J, 438

[56] References Cited
UNITED STATES PATENTS

| | | |
|---|---|---|
| 3,101,589 | 8/1963 | Hamrick et al................ 252/461 X |
| 3,285,845 | 11/1966 | Demeester..................... 252/461 X |
| 3,389,965 | 6/1968 | Ruiter et al.................... 252/461 X |
| 3,489,692 | 1/1970 | Bourne et al. ................. 252/461 X |

Primary Examiner—Daniel E. Wyman
Assistant Examiner—W. J. Shine
Attorney, Agent, or Firm—Daniel T. Anderson; Alan D. Akers; Willie Krawitz

[57] ABSTRACT

This invention relates to a low cost spontaneous decomposition catalyst for hydrazine or mixtures containing hydrazine-hydrazine nitrate propellant fuels, which permits a low temperature ignition of the fuels and retains its activity after exposure to the propellant flame environment. The catalyst is produced by coating rhenium metal or a rhenium-molybdenum mixture on a support body such as alumina. Iron, nickel, copper, silver, gold, iridium, or ruthenium may be included as co-catalyst metals.

3 Claims, 4 Drawing Figures

3,846,339

CATALYST FOR THE SPONTANEOUS DECOMPOSITION OF MONOPROPELLANT HYDRAZINE

This is a division of application Ser. No. 698,846, filed Jan. 18, 1968, now U.S. Pat. No. 3,732,694.

Problems with prior-art hydrazine decomposition catalysts have frequently come from the fact that the catalytic materials are decomposed or reacted at the flame temperature of the propellant. Several catalysts containing cobalt, copper, and alkali metals are known to decompose hydrazine at ambient temperatures, however they are deactivated by flame temperature and thus are suitable for only one start. The transition group metal salts and silver salts also suffer the undesirable property of decomposing at hydrazine flame temperatures. These problems with catalysts did not arise until rocket engine art was extended to include more than one start.

Hydrazine spontaneous decomposition catalysts, according to this invention are produced by coating rhenium or mixtures of rhenium and molybdenum on a high surface area support, such as alumina, thoria, or zirconia. When desired, a certain degree of enhancement or synergism may be achieved by adding a minor amount of co-catalyst metals such as iron, nickel, copper, silver, gold, iridium, and ruthenium.

Proportions of the catalytic ingredients are effective over a wide range. Rhenium or mixtures of rhenium and molybdenum may be employed in a range from 1–60 weight percent of the support particle, however, 5–35 weight percent is generally preferred. Co-catalysts, iron, nickel, copper, gold, silver, iridium, and ruthenium, may be employed in amounts up to 50 weight percent of the support particle, however, they should be present in minor amounts with respect to the whenium or the rheniummolybdenum mixture and should never exceed the weight percent of the rhenium or the rhenium-molybdenum mixture present.

Preferably, preparation of the rhenium catalyst is accomplished by soaking the support body in a saturated solution of rhenium trichloride for at least one hour and decanting the excess solution. These support pellets are then removed and dried in vacuum at approximately 100°C. Upon completion of the drying step, the catalyst is activated by reduction in a slow moving stream of dry hydrogen at approximately 700°C. One or more promoters or co-catalysts such as iron, nickel, rhenium silver, gold, iridium, or ruthenium are applied to the rhenium catalyst in a similar manner. Support bodies which have been coated with the rhenium catalyst are immersed in a dilute aqueous solution of a soluble salt of the co-catalyst metal. The excess solution is decanted off and the catalyst impregnated pellets are dried and reduced in a manner similar to the rhenium.

For the initial start with hydrazine at temperatures as low as 3°C, oxidizer-starters may be included into the catalyst bed. A low temperature hydrazine starter consisting of iodine pentoxide is described in U.S. Pat. No. 3,298,182. Other compounds which are suitable for use as ignition starters may be selected from the group consisting of ammonium dichromate, silver nitrate, chromic trioxide, potassium permanganate, and sodium cobaltinitrite. These starter compounds are used in an range of 5 percent to 15 percent by weight of the total catalyst bed.

After the decomposition catalyst has been warmed by the initial firing of the engine, the catalyst exhibits an ignition delay in which time varies inversely with the temperature, i.e., as the temperature increases, the ignition time after the contact of the fuel and the catalyst is decreased. The following table sets forth the delays which can be expected at the listed temperatues using a 26 percent rhenium catalyst on a Reynolds RA–1 Alumina support.

TABLE

| Temperature °F | Ignition Delay Milli seconds |
|---|---|
| 72 | >100 |
| 167 | 30 |
| 205 | 10 |
| 340 | 5 |

A better understanding of the rhenium catalyst performance may be obtained by reference to the drawings which are traces of a 3 lb. thrust engine using 0.014 lb. of hydrazine per second for a duration of 80 milli seconds, wherein.

Figure 1:
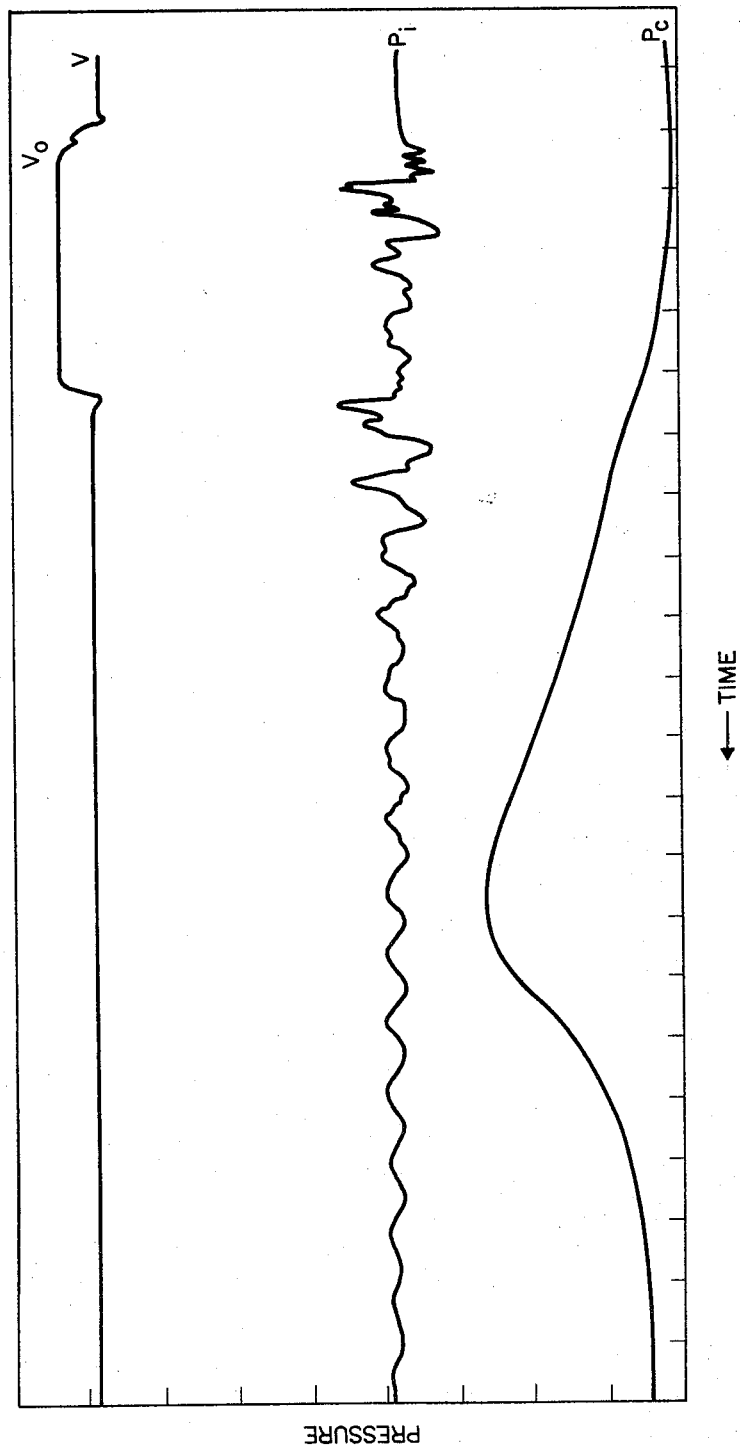
FIG. 1 is a time v. pressure trace of the fire valve (V), the injection pressure ($P_i$), and the chamber pressure ($P_c$) at an initial chamber temperature of 165°F.
Figure 2:
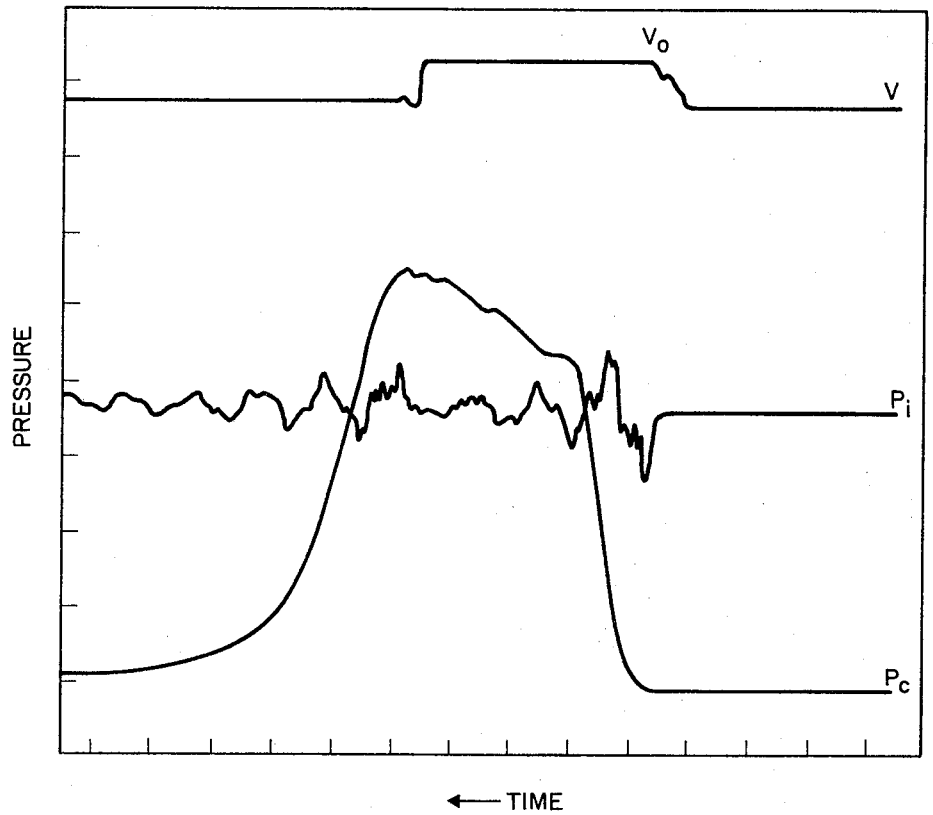
FIG. 2 is a time v. pressure trace of the three variables set forth in FIG. 1 above at an initial chamber temperature of 375°F.
Figure 3:
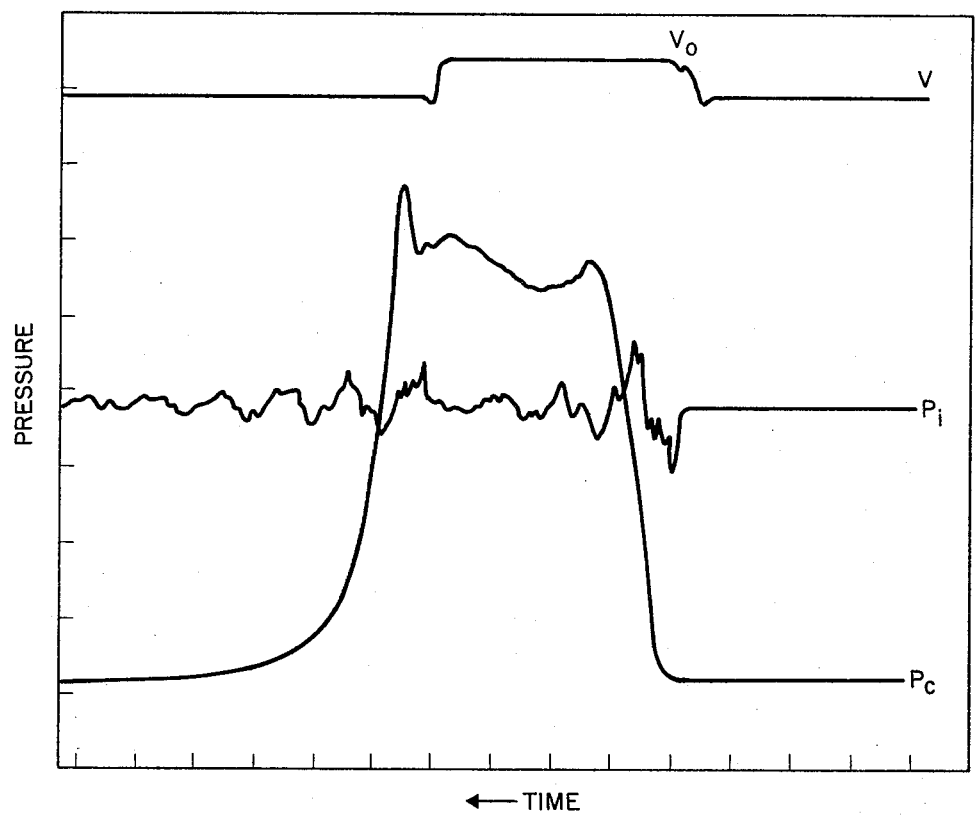
FIG. 3 is a time v. pressure trace of the three variables set forth in FIG. 1 above at an initial chamber temperature of 540°F.
Figure 4:
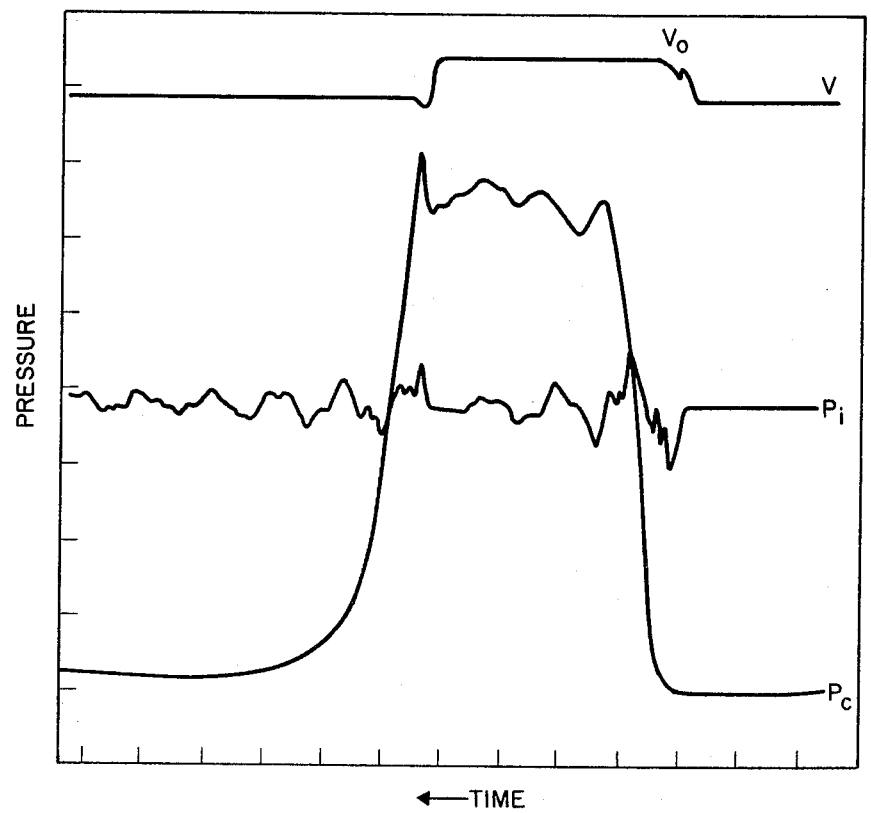
FIG. 4 is a time v. pressure trace of the three variables set forth at an initial chamber temperature of 1290°F.

An inspection of the FIGS. shows two interesting effects which are related to the initial chamber temperature. The start of each run is timed from the slight dip near the top of the initial pressure rise on the fire valve trace (V) which indicates the point the valve opens ($V_o$). It may be noted that there is a comparative longer delay in FIG. 1 between the valve opening and a noticeable pressure rise than there is in the other FIGS. It may be noted also that greater pressures in the combustion chamber are achieved by the increase in initial temperatues in the chamber. In FIG. 1 a peak pressure of 64 psia was obtained when the initial chamber temperature was 165°F; in FIG. 2 a peak pressure of 133 psia was obtained when the initial chamber temperature was 375°F; in FIG. 3 a peak pressure of 147 psia was obtained when the initial chamber temperature was 540°F; and in FIG. 4 a peak pressure of 170 psia was obtained when the initial chamber temperature was 1290°F.

The decomposition catalyst described above may be employed for hydrazine, alone, or any hydrazine-containing fuel mixture, such as hydrazine-hydrazine nitrate. Details of catalyst position known in the art may be applied here, i.e., no special considerations are necessary as a result of use of the instant catalysts. Generally, all that is required is that the catalysts come in contact with the hydrazine fuel prior to or during ignition of the fuel as the following example shows.

EXAMPLE

A catalyst of the type which is the subject of this invention was used to ignite and decompose hydrazine in 3-pound thrust engine hardware. The catalyst was prepared by the method cited above and contained 25.8 percent by wt. rhenium on a high surface area support of Reynolds RA-1 Alumina. The fuel used was a monopropellant containing 100 percent hydrazine. It was found that when the fuel was injected into the catalyst bed, smooth, rapid ignition occurred when the catalyst bed was initially at ambient temperature or near the hydrazine flame temperature. The test engine was operated in a pulsed mode of 80 millisecond firings each second and gave reproducible ignition and smooth decomposition of the fuel. In addition, the engine was operated at steady state for more than 10 seconds and the catalyst continued to provide smooth decomposition of the hydrazine throughout the firing.

Hydrazine decomposition catalysts, according to this invention, are attractive not only because of the relative ease of preparation, but because of the relatively low cost of the materials employed. In addition catalysts according to this invention, do not decompose upon exposure to the propellant flame environment. This advantageous property permits multiple reignition of rocket engines, a feat of some difficulty and questionable reliability heretofore.

We claim:

1. A composition for the spontaneous decomposition of hydrazine propellant fuels consisting essentially of a low temperature oxidizer-starter selected from the group consisting of iodine pentoxide, ammonium dichromate, silver nitrate, chromic trioxide, potassium per-manganate, and sodium cobaltinitrite and rhenium coated on a high surface area support.

2. A catalyst for the spontaneous decomposition of hydrazine propellant fuels consisting essentially of a major amount of rhenium-molybdenum and a minor amount of a metal selected from the group consisting of iron, nickel, copper, silver, gold, iridium, and ruthenium, coated on a high surface area support, the aggregate amounting to 1 to 60 weight percent, and the balance the support particle.

3. A catalyst according to claim 2 wherein the aggregate amounts to 5 to 35 weight percent.

* * * * *